United States Patent
Gattiker et al.

(10) Patent No.: US 11,645,329 B2
(45) Date of Patent: May 9, 2023

(54) CONSTRUCTING, EVALUATING, AND IMPROVING A SEARCH STRING FOR RETRIEVING IMAGES INDICATING ITEM USE

(71) Applicant: International Business Machines Corporation, Armonk, NY (US)

(72) Inventors: Anne E. Gattiker, Austin, TX (US); Sujatha Kashyap, Austin, TX (US); Minh Ngoc Binh Nguyen, Los Angeles, CA (US); Samuel Thomas, Elmsford, NY (US); Kaipeng Li, Houston, TX (US); Thomas Hubregtsen, Munich (DE)

(73) Assignee: International Business Machines Corporation, Armonk, NY (US)

( * ) Notice: Subject to any disclaimer, the term of this patent is extended or adjusted under 35 U.S.C. 154(b) by 1462 days.

(21) Appl. No.: 15/856,505

(22) Filed: Dec. 28, 2017

(65) Prior Publication Data

US 2019/0205431 A1     Jul. 4, 2019

(51) Int. Cl.
*G06F 16/242*     (2019.01)
*G06F 16/583*     (2019.01)
(Continued)

(52) U.S. Cl.
CPC ........ *G06F 16/583* (2019.01); *G06F 16/2425* (2019.01); *G06F 16/24578* (2019.01); *G06F 16/9535* (2019.01)

(58) Field of Classification Search
CPC .... G06F 16/285; G06F 16/288; G06F 16/583; G06F 16/2425
See application file for complete search history.

(56) References Cited

U.S. PATENT DOCUMENTS

| 6,032,130 A | 2/2000 | Alloul et al. |
| 7,503,088 B2 | 3/2009 | Jo et al. |

(Continued)

FOREIGN PATENT DOCUMENTS

| IN | 2015DE03654 A | 7/2017 |
| KR | 1020080111574 A | 12/2008 |

OTHER PUBLICATIONS

Ben-Haim et al. "Improving Web-based Image Search via Content Based Clustering," In Proceedings of the 2006 Conference on Computer Vision and Pattern Recognition Workshop (CVPRW '06). IEEE Computer Society, Washington, DC, USA, 6 pages. DOI= http://dx.doi.org/10.1109/CVPRW.2006.100.

(Continued)

*Primary Examiner* — Grace Park
(74) *Attorney, Agent, or Firm* — Cantor Colburn LLP; Brian Welle

(57) ABSTRACT

Examples of techniques for constructing, evaluating, and improving a search string for retrieving images are disclosed. In one example implementation according to aspects of the present disclosure, a computer-implemented method includes receiving, by a processing device, a plurality of images as search results returned based at least in part on a search string for an item in the form of a tuple including an item class, an action and an actor. The method further includes determining, by the processing device, whether the search string is effective at indicating a common item use based on image similarity. The method further includes, based at least in part on determining that the search string is ineffective at indicating the item use, generating, by the processing device, an alternative search string.

12 Claims, 13 Drawing Sheets

(51) Int. Cl.
G06F 16/9535 (2019.01)
G06F 16/2457 (2019.01)

(56) References Cited

U.S. PATENT DOCUMENTS

| | | | |
|---|---|---|---|
| 7,558,787 B2 | 7/2009 | Parikh | |
| 7,627,661 B2 | 12/2009 | Tischer | |
| 9,092,458 B1 | 7/2015 | Persona et al. | |
| 9,135,329 B1 | 9/2015 | Gupta | |
| 9,317,533 B2 | 4/2016 | Yang et al. | |
| 9,565,512 B2 | 2/2017 | Rhoads et al. | |
| 9,582,803 B2 | 2/2017 | Subhanjan | |
| 9,785,975 B2 | 10/2017 | Ramer et al. | |
| 9,881,027 B2 | 1/2018 | Lenahan et al. | |
| 2002/0052863 A1 | 2/2002 | Morikage et al. | |
| 2003/0187632 A1 | 2/2003 | Menich | |
| 2003/0182310 A1 | 9/2003 | Charnock et al. | |
| 2008/0091675 A1 | 4/2008 | Chu et al. | |
| 2010/0042575 A1 | 2/2010 | Tischer | |
| 2010/0086192 A1* | 4/2010 | Grigsby | G06Q 30/0641 707/E17.014 |
| 2010/0094854 A1* | 4/2010 | Rouhani-Kalleh | G06F 16/3325 707/706 |
| 2011/0078176 A1 | 3/2011 | Hayaishi | |
| 2011/0085739 A1 | 4/2011 | Zhang et al. | |
| 2012/0209751 A1 | 8/2012 | Chen et al. | |
| 2012/0296926 A1 | 11/2012 | Kalin et al. | |
| 2013/0007032 A1 | 1/2013 | Klappert et al. | |
| 2013/0124555 A1 | 5/2013 | Duquene et al. | |
| 2014/0201126 A1 | 7/2014 | Zadeh et al. | |
| 2015/0039606 A1 | 2/2015 | Salaka et al. | |
| 2015/0142851 A1 | 5/2015 | Gupta et al. | |
| 2015/0169646 A1* | 6/2015 | Ioffe | G06F 16/532 707/740 |
| 2015/0317320 A1 | 11/2015 | Miller et al. | |
| 2016/0125765 A1 | 5/2016 | Meretei et al. | |
| 2016/0188637 A1 | 6/2016 | Lenahan et al. | |
| 2017/0111225 A1 | 4/2017 | Sawal et al. | |
| 2017/0277736 A1* | 9/2017 | Sharma | G06F 16/353 |
| 2018/0150551 A1* | 5/2018 | Wang | G06F 16/338 |

OTHER PUBLICATIONS

Bose et al., A Solution for a Mobile Computing Device Along with Supporting Infrastructure for the Needs of Illiterate Users in Rural Areas, Annual IEEE India Conference (INDICON), IEEE, 2012, 6 pgs.
Chen, Y., "Understanding User Intentions in Vertical Image Search," Thesis, University of Kansas, Jul. 7, 2011, 74 pgs.
Christensen, Laundry Detergent Pods are 'Real Risk' to Children, CNN, Nov. 10, 2014, 2 pgs.
Delgado et al. "Automated Illustration of News Stories," 2010 IEEE Fourth International Conference on Semantic Computing, Pittsburgh, PA, 2010, pp. 73-78, doi: 10.1109/ICSC.2010.68.
Duan et al. "Supporting Keyword Search in Product Database: A Probabilistic Approach," J. VLDB Endow. 2013, 6, pp. 1786-1797.
Gattiker et al., "Constructing, Evaluating, and Improving a Search String for Retrieving Images Indicating Item Use", U.S. Appl. No. 15/856,485, filed Dec. 28, 2017.
Kashyap et al., "Constructing, Evaluating, and Improving a Search String for Retrieving Images Indicating Item Use", U.S. Appl. No. 15/856,499, filed Dec. 28, 2017.
Hsieh et al. "Online image search result grouping with MapReduce-based image clustering and graph construction for large-scale photos," 2014, J. Vis. Commun. Image Represent. 25, Feb. 2, 2014, pp. 384-395. DOI=http://dx.doi.org/10.1016/j.jvcir.2013.12.010.
Hulth "Improved automatic keyword extraction given more linguistic knowledge," In Proceedings of the 2003 conference on Empirical methods in natural language processing (EMNLP '03). Association for Computational Linguistics, Stroudsburg, PA, USA, pp. 216-223. DOI: https://doi.org/10.3115/1119355.1119383.
IBM, et al.," Extracting application profiles from a product's trace data", Ip.com, Jan. 18, 2017, p. 1-4.
Iwai, M. et al.,"Acquiring Distributed Representations for Verb-Object Pairs by Using Word2Vec", Paclic, Pacific Asia Conference on Language, Information and Computation, 2015, p. 1-9.
Jeon, J. et al., "Automatic Image Annotation and Retrieval using CrossMedia Relevance Models", SIGIR, ACM, Jul. 28-Aug. 1, 2003, p. 1-8.
Jing et al. "Pagerank for product image search," 2008, In Proceedings of the 17th international conference on World Wide Web (WWW '08), ACM, New York, NY, USA, pp. 307-315. DOI: https://doi.org/10.1145/1367497.1367540.
Jing et al."Canonical Image Selection from the Web," In Proceedings of the 6th ACM international conference on Image and video retrieval (CIVR '07). ACM, New York, NY, USA, 8 pages. DOI= http://dx.doi.org/10.1145/128.
Joshi et al. "The Story Picturing Engine—A System for Automatic Text Illustration," ACM Transactions on Multimedia Computing, Communications and Applications, vol. 2, No. 1, Feb. 2006, pp. 1-22.
Karpathy, et al.,"Deep Visual-Semantic Alignments for Generating Image Descriptions", IEEE Transactions on Pattern, vol. 39, Issue 4, Aug. 5, 2016, p. 1-7.
Kashyap et al., "Constructing, Evaluating, and Improving a Search String for Retrieving Images Indicating Item Use", U.S. Appl. No. 15/856,511, filed Dec. 28, 2017.
Kashyap, "Clarifying the Complex with a 'Simpler Voice'", Think Blog, Jul. 31, 2017, 1 pg.
Kennedy et al. "Generating diverse and representative image search results for landmarks," 2008, In Proceedings of the 17th international conference on World Wide Web (WWW '08). ACM, New York, NY, USA, 10 pages. DOI: https://doi.org/10.1145/1367497.1367539.
Khasawneh et al. "Employing physical distance in ranking image-search results," International Journal of Intelligent Information and Database Systems, vol. 8, No. 4, pp. 324-339, Mar. 2014.
Krapac et al. "Improving web image search results using query-relative classifiers," 2010 IEEE Computer Society Conference on Computer Vision and Pattern Recognition, San Francisco, CA, 2010, 8 pages, doi: 10.1109/CVPR.2010.5540092.
Lee et al. "Generating queries from user-selected text," 2002 In Proceedings of the 4th Information Interaction in Context Symposium (IIIX '12). ACM, New York, NY, USA, pp. 100-109. DOI= http://dx.doi.org/10.1145/2362724.2362744.
List of IBM Patents or Patent Applictions Treated as Related; (Appendix P), Date Filed Sep. 18, 2019, 2 pages.
Liu, et al.,"Composition-Aware Scene Optimization for Product Images", Eurographics, vol. 34, 2015, p. 1-12.
Lore, M, Walmart, Google Partner to Make Shopping Even Easier—Here's How, Innovation, Aug. 23, 2017, 2 pgs. https://blog.walmart.com/innovation/20170823/walmart-google-partner-to-make-shopping-even-easier-heres-how.
Luo et al "A World Wide Web Based Image Search Engine Using Text and Image Content Features," Internet Imaging IV, Simone Santini, Raimondo Schettini, Editors, Proceedings of SPIE-IS&T Electronic Imaging, SPIE, 2003, vol. 5018, pp. 123-130.
Luo, C. et al.,"Query Ambiguity Identfication Based on User Behavior Information", Natural Science Foundation, Information Retrieval Societies Conferences, AIRS, Dec. 3-5, 2014, p. 1-12.
Mansimov, E. et al.,"Generating Images From Captions With Attention", arXiv:1511, Feb. 29, 2016, p. 1-12.
Medhi et al. "Optimal audio-visual representations for illiterate users of computers," In Proceedings of the 16th International conference on World Wide Web (WWW '07). 2007, ACM, New York, NY, USA, pp. 873-882. DOI: https://doi.org/10.1145/1242572.1242690.
Mihalkova, et al. "Learning to Disambiguate Search Queries from Short Sessions," In Proceedings of the European Conference on Machine Learning and Principles and Practice of Knowledge Discovery in Databases, Part 2, Bled, Slovenia, Sep. 2009, 16 pages.
Mishra et al. "Image Retrieval using Textual Cues," 2013 IEEE International Conference on Computer Vision, Sydney, VIC, 2013, 8 pages, doi: 10.1109/ICCV.2013.378.

(56) References Cited

OTHER PUBLICATIONS

Mullin "Robot-writing increased AP's earnings stories by tenfold," The Poynter Institute, Jan. 29, 2015, accessed Feb. 27, 2018, 5 pages, https://www.poynter.org/news/robot-writing-increased-aps-earnings-stories-tenfold.
Munson et al. "To Search for Images on the Web, Look at the Text, Then Look at the Images," Proc. First Int'l Workshop on Web Document Analysis, Sep. 2001, 4 pages, [online] Available: http://http://www.csc.liv.ac.uk/wda2001.
Murdock et al., "Search and Exploration of X-rated Information" WSDM'13 Workshop Proceedings, Feb. 5, 2013 (33 pages).
NBC News, More adults have died from eating laundry detergent pods than kids, @nbcnewshealth, nbcnews.com, Jun. 16, 2017, 1 pg.
Nederstigt et al. "An Automated Approach to Product Taxonomy Mapping in E-Commerce," 2012, In: Casillas J., Martínez-López F., Corchado Rodríguez J. (eds) Management Intelligent Systems. Advances in Intelligent Systems and Computing, vol. 171. Springer, Berlin, Heidelberg, 10 pages.
Nguyen, et al. ,"Simpler Voice: A Key Message & Visual Description Generatior System for Illiteracy", Association for the Advancement of Artificial Intelligence, 2018, p. 1-6.
Patel et al. "Semantic image search using queries," Department of Electrical Engineering, Stanford University, 2015, 7 pages.
Razavi et al. "Offensive language detection using multi-level classification," 2010, In Proceedings of the 23rd Canadian conference on Advances in Artificial Intelligence (AI'10), Atefeh Farzindar and Vlado Kešelj (Eds.). Springer-Verlag, Berlin, Heidelberg, 12 pages. DOI=http://dx.doi.org/10.1007/978-3-642-13059-5_5.
Rosin et al. "A Bayesian Model for Image Sense Ambiguity in Pictorial Communication Systems," 2011, University of Wisconsin—Madison, Computer Sciences Department, Technical Report #1692, Jun. 2011, 8 pages, cs.wisc.edu.
Sanusi "People Keep Mistaking African-Caribbean Hairspray For Cooking Oil." BuzzFeed, BuzzFeed UK, Jun. 7, 2016, 14 pages, www.buzzfeed.com/victoriasanusi/some-people-have-been-using-hair-sheen-as-cooking-oil?utm_term=.reJaqMKP4#.kvOI8450e.
Schroff et al. "Harvesting Image Databases from the Web," IEEE Transactions on Pattern Analysis and Machine Intelligence, vol. 33, No. 4, Apr. 2011, pp. 754-766.
Slawski, B., Ordering Images (and other Multimedia Search Results by Predicting Clickthoughs, SEO by the Sea, 2009 (4 pages).
Song et al. "Identifying ambiguous queries in web search," 2007, In Proceedings of the 16th international conference on World Wide Web (WWW '07). ACM, New York, NY, USA, pp. 1169-1170. DOI: https://doi.org/10.1145/1242572.1242749.
Vandeghinste et al. "Translating Text into Pictographs," Natural Language Engineering, 2015, vol. 23, No. 2, Cambridge University Press, pp. 217-244.
Wang, et al.,"Query Ambiguity Revisited: Clickthrough Measures for Distinguising Infomrational and Ambiguous Queries", The Annual Conference fo the North American Chapter of the ACL, 2010, pp. 1-4.
White pages, "The Thirtieth Annual Conference on Innovative Applications of Artificial Intelligence", AAAI Confernece, 2018, Nov. 21, 2017, p. 1-9.
Wikipedia, "Content-based image retrieval" <URL: https://en.wikipedia.org/wiki/Content-based_image_retrieval> 9 pages.
Xiang et al., Detecting Offensive Tweets vis Topical Feature Discovery Over a Large Scale Twitter Corpus, CIKM 2012, 5 pgs.
Yang et al. "Corpus-guided sentence generation of natural images," 2002, In Proceedings of the Conference on Empirical Methods in Natural Language Processing (EMNLP '11). Association for Computational Linguistics, Stroudsburg, PA, USA, 11 pages.
Yenala et al., Convolutional Bi-directional LSTM for Detecting Inappropriate Query Suggestions in Web Search, LNCS, vol. 10234 (13 pages).
Zha "Generic summarization and keyphrase extraction using mutual reinforcement principle and sentence clustering," Proc. 25th ACM SIGIR Conference. 2002, pp. 113-120.
Zhang et al. "Probabilistic query rewriting for efficient and effective keyword search on graph data," Proceedings of the J. VLDB Endowment, vol. 6, No. 14, 2013, p. 1642-1653.
Zhang, H. et al.,"StackGAN: Text to Photo-realistic Image Synthesis with Stacked Generative Adversarial Networks", arXiv:1612, Aug. 5, 2017, pp. 1-14.
Zheng, et al.,"K2Q: Generating Natural Language Questions From Keywords With User Refinements", Conference, 2011, p. 1-9.
Zhou et al. "Supporting Keyword Search for Image Retrieval with Integration of Probabilistic Annotation," Sustainability Journal, May 22, 2015, 7, pp. 6303-6320.
Nguyen, et al.,"Simpler Voice: A Key Message & Visual Description Generatior System for Illiteracy", Women in Machine Learning—Conference on Neural Information Processing Systems (Dec. 2017) 1 page.
Yenala et al., Convolutional Bi-directional LSTM for Detecting Inappropriate Query Suggestions in Web Search, LNCS, vol. 10234; Apr. 23, 2017 (13 pages).
Wikipedia, [online]; [retrieved on Nov. 19, 2019]; retrieved from the Internet; https://en.wikipedia.org/wiki/Content-based_image_retrieval.

* cited by examiner

FIG. 11

CONSTRUCTING, EVALUATING, AND IMPROVING A SEARCH STRING FOR RETRIEVING IMAGES INDICATING ITEM USE

STATEMENT REGARDING PRIOR DISCLOSURES BY THE INVENTOR OR A JOINT INVENTOR

The following disclosures are submitted under 35 U.S.C. 102(b)(I)(A): Kashyap, "Clarifying the Complex with a 'Simpler Voice'", THINK Blog, Jul. 31, 2017; and Nguyen, et al. "SIMPLER VOICE: A KEY MESSAGE & VISUAL DESCRIPTION GENERATOR SYSTEM FOR ILLITERACY", Women in Machine Learning—Conference on Neural Information Processing Systems (December 2017).

It is submitted that these disclosures are not prior art under AIA 35 U.S.C. 102(a)(1) because they were made by the inventor or a joint inventor and therefore qualify as a "Grace Period Disclosure" under 35 U.S.C. § 102(b)(1)(A).

BACKGROUND

The present invention generally relates to data processing, and more specifically, to constructing, evaluating, and improving a search string for retrieving images indicating item use.

Image searching involves using a search string to search a data store that contains images to identify and return images based on the search string. Image searching can be useful when searching for something particular. For example, if a user wants to search for images of a ball, the user can enter "ball" into an image search engine and images containing a ball or balls can be returned.

Reverse image searching involves using an existing image to search a data store that contains images to identify and return images that match (or are similar to) the existing image. This can be useful to search for duplicate content, search for a source of the existing image, finding better (higher) resolution copies of the existing image, etc.

SUMMARY

Aspects of techniques including systems, methods, and computer program products for constructing, evaluating, and improving a search string for retrieving images are disclosed.

According to aspects of the present disclosure, a computer-implemented method for improving a search string is provided. A non-limiting example of the computer-implemented method includes receiving, by a processing device, a plurality of images as search results returned based at least in part on a search string for an item in the form of a tuple including an item class, an action and an actor. The method further includes determining, by the processing device, whether the search string is effective at indicating a common item use based on image similarity. The method further includes, based at least in part on determining that the search string is ineffective at indicating the item use, generating, by the processing device, an alternative search string. According to aspects of the present disclosure, the method can be implemented by a system and/or a computer program product as described herein.

In some aspects, determining whether the search string is effective at indicating the item use includes calculating a similarity score by comparing at least one of the plurality of images to at least one other of the plurality of images, determining whether the similarity score exceeds a threshold, and indicating that the search string is ineffective at indicating the item use based at least in part on determining that the similarity score does not exceed the threshold. In some aspects, the alternative search string is in a form of a tuple that includes an item class, an action, and an actor. In some aspects, generating the alternative search string further includes using ontology siblings to generate the alternative search string. In some aspects, using ontology siblings to generate the alternative search string further includes using ontology siblings of the item class to choose the action and the actor associated with the item class. In some aspects, generating the alternative search string further comprises using n-grams contained in the titles of the items in an item class to generate the alternative search string. In some aspects, generating the alternative search string further includes identifying that the item class has multiple common uses. In some aspects, the item is identified as having multiple common uses when a class for the item is found in multiple places in an ontology listing. In some aspects, the item class is identified as having multiple common uses when multiple actions or actors are identified for the item class based at least in part on using an n-gram technique. In some aspects, the item class is identified as having multiple common uses when multiple actions or actors are identified for the item class based at least in part on using a word embeddings technique.

It should be appreciated that the present techniques provide an image or images to a user that capture an essence of an item (e.g., a common use of the item). This is advantageous, for example, for non-reading users that have difficulty knowing what certain items are when they go shopping because they cannot read item labels. In some situations, a user does not know what word(s) or phrase(s) to use to create a search string to return the type of images desired. The present techniques enable a user to capture item information that can be used to create a search string to retrieve an image or images that capture the essence of the item using the item information. In particular, techniques for constructing, evaluating, and improving a search string for retrieving images that illustrate an item, and in particular indicate how the item is used, are provided herein. As a result, the techniques described herein represent an improvement to existing searching (e.g., image searching) techniques by providing more meaningful search results.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 11 depicts a similarity matrix, according to aspects of the present disclosure.

Figure 1:
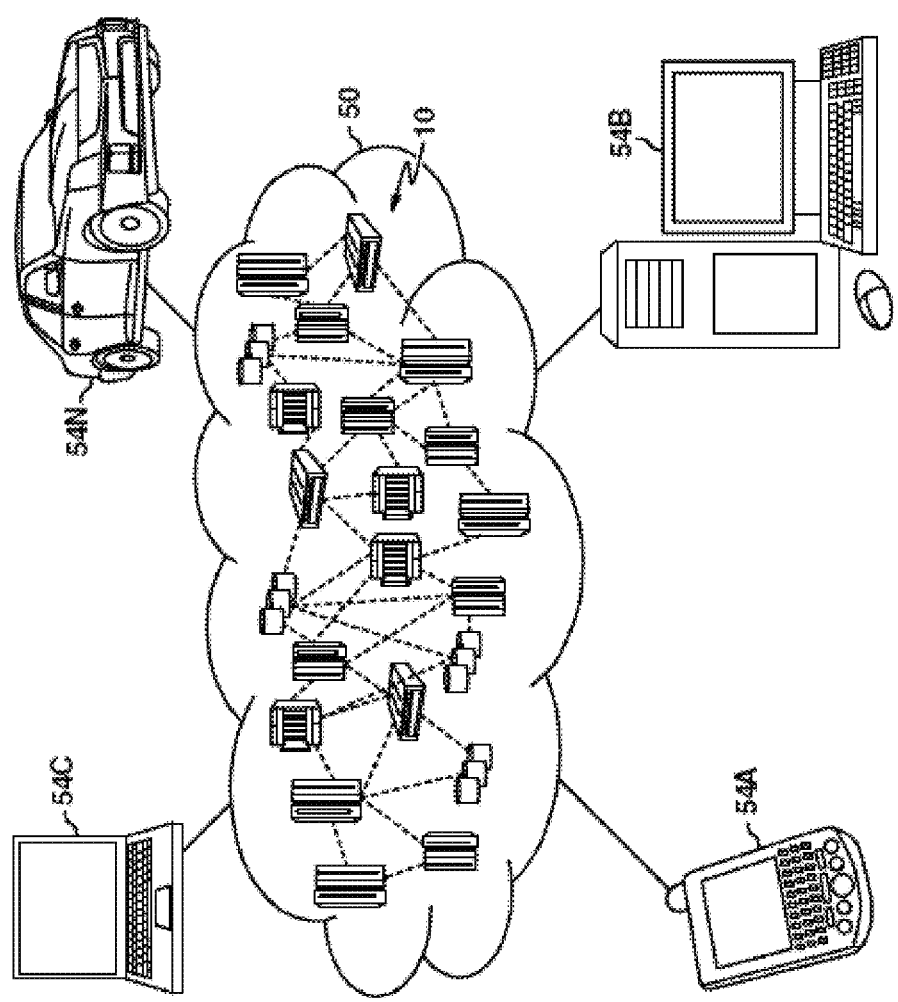
FIG. 1 depicts a cloud computing environment according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
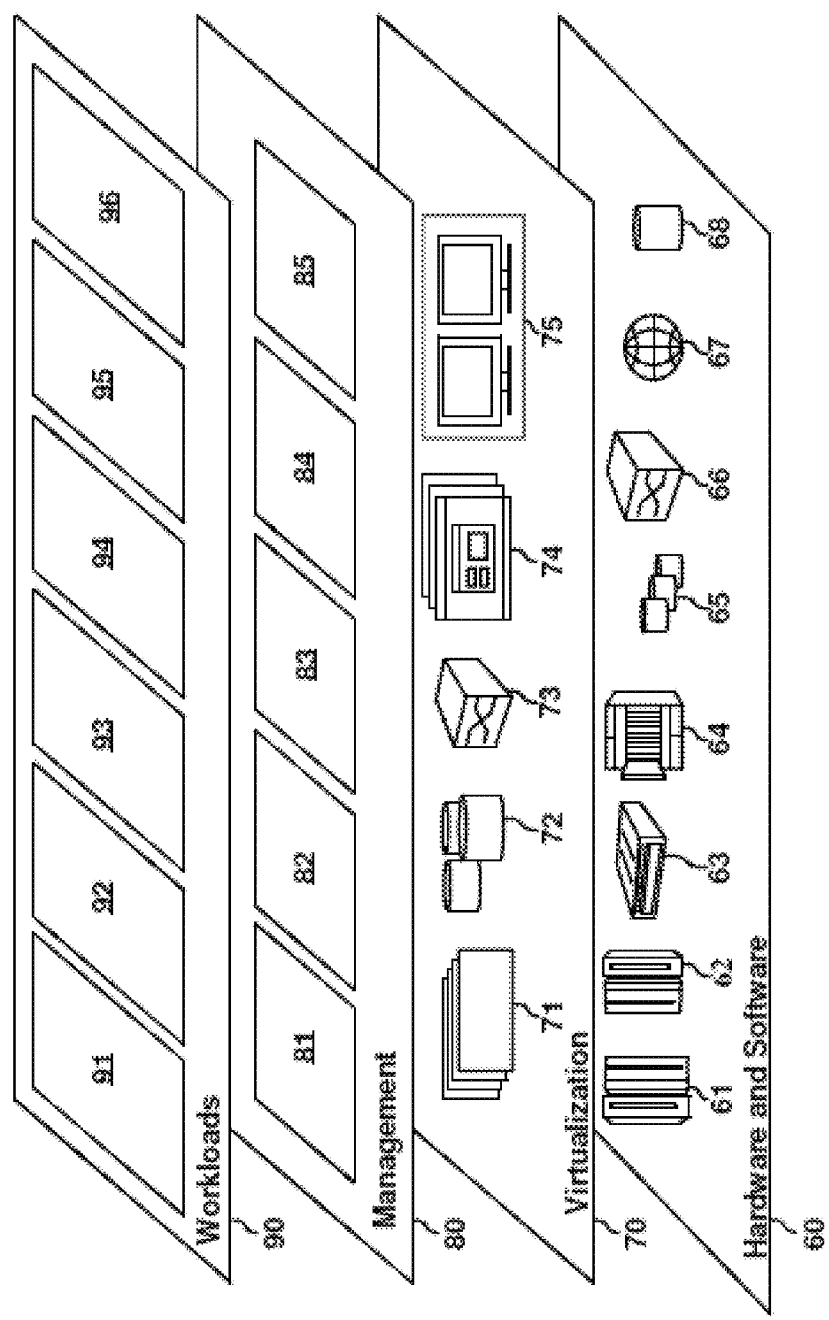
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search string creation, evaluation, and/or improvement 96.

Figure 3:
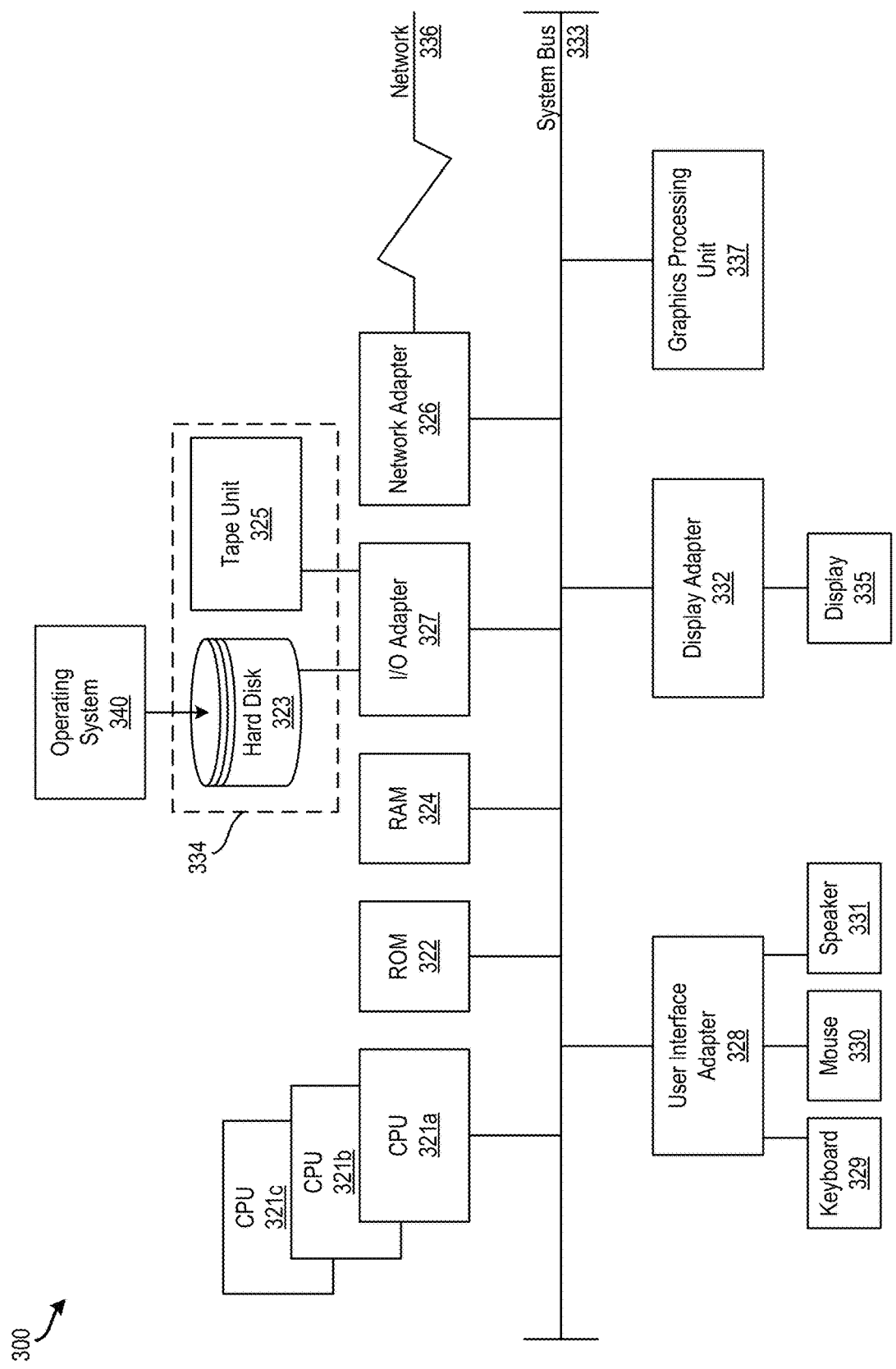
FIG. 3 depicts a block diagram of a processing system for implementing the techniques described herein according to aspects of the present disclosure.

It is understood in advance that the present disclosure is capable of being implemented in conjunction with any other type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 30, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, it is desirable in some situations to present an image to a user that captures the essence of an item. Non-reading users have difficulty knowing what products are when they go shopping because they cannot read labels. Even reader users may be mystified by what a product is, especially since marketing goals may lead to purposely confusing product labeling. Reader users also may prefer a quick indication of what a product is, rather than reading through product labeling.

In some situations, a user does not know what word(s) or phrase(s) to use to create a search string to return the type of images desired. For example, if a user notices a product in a store and wants more information about the product, the user may not know enough about the product in order to create an adequate/proper search string. Moreover, an image search on an item type such as "aftershave," or the title of a specific type of aftershave, typically returns images of product packaging. Such images fall short of the goal of communicating to the user the essence of the item. This can be particularly true for users without the ability to read, etc.

Taking a picture (such as with the user's smartphone) and performing a reverse image search often fails to provide the additional information that the user desires. For example, since reverse image searching typically returns copies of the images searched, the user who takes a picture of a product in a store typically receives images of product packaging, rather than images that illustrate the product's use.

Turning now to an overview of according to aspects of the present disclosure, the above-described shortcomings of the prior art are overcome by providing techniques for constructing, evaluating, and improving a search string for retrieving images that illustrate an item, and in particular indicate how the item is used. It should be appreciated that the techniques described herein can be used individually and/or in suitable combinations to retrieve images using a search string.

According to aspects of the present disclosure, constructing a search string includes receiving an item identifier (such as from a user), retrieving an item description based on the item identifier, identifying a tuple based on the item description, constructing a search string based on the tuple, and retrieving an image using the search string. A tuple can take the form of an actor (i.e., a subject), an action (i.e., a verb), and an item class. This enables, for example, a search string to be constructed from an image of an item.

According to aspects of the present disclosure, evaluating a search string includes receiving images returned as results to an executed search string, calculating a similarity score by comparing at least one of the images to the other images, determining whether the similarity score exceeds a threshold, and indicating that the search string is ineffective at indicating the item use when it is determined that the similarity score does not exceed the threshold. This enables, for example, the effectiveness of a search string to be evaluated.

According to aspects of the present disclosure, improving a search string includes receiving a plurality of images as search results returned based on a search string for an item, determining whether the search string is effective, and generating an alternative search string if the search string is ineffective. Using these techniques, multiple search strings can be generated to improve the original search string and provide enhanced search results (e.g., images) to the user.

Example embodiments of the disclosure include or yield various technical features, technical effects, and/or improvements to technology. Example embodiments of the disclosure provide a search string creation, evaluation, and improvement techniques to create a search string based on an item description to identify a tuple (e.g., an actor, an action, and an item class) used to create the search string, to evaluate the search string by building a similarity matrix and calculating similarity scores for image pairs, and to improve a search string when it is determined that the search string is ineffective. These aspects of the disclosure constitute technical features that yield the technical effect of creating search strings to return meaningful image results based on an image or other identifier provided by a user, evaluating the search string to determine if it is ineffective, and improving the search string when necessary (e.g., if the search string is ineffective). As a result of these technical features and technical effects, the techniques described herein represent an improvement to existing searching (e.g., image searching) techniques by providing more meaningful search results. It should be appreciated that the above examples of technical features, technical effects, and improvements to technology of example embodiments of the disclosure are merely illustrative and not exhaustive.

Figure 4:
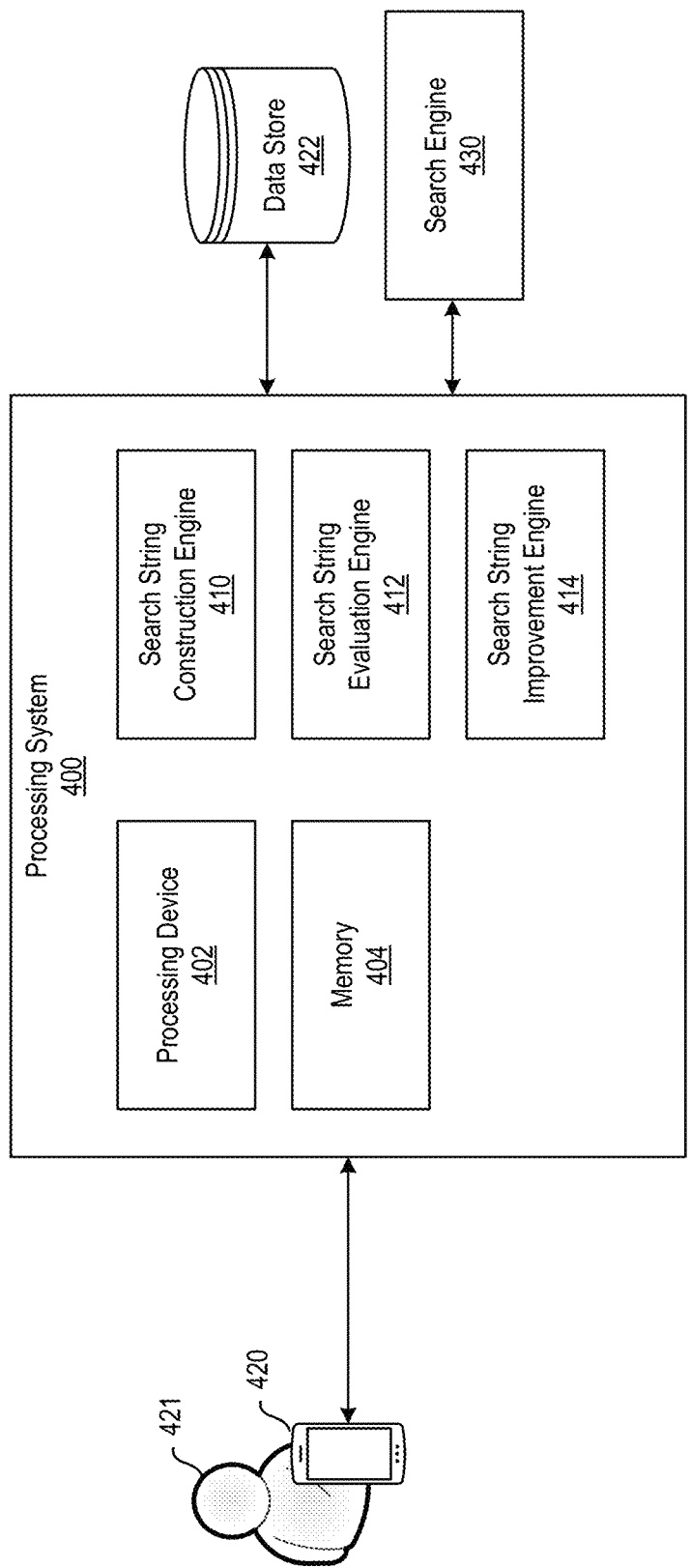
FIG. 4 depicts a block diagram of a processing system for search string construction, evaluation, and improvement according to aspects of the present disclosure.

FIG. 4 depicts a block diagram of a processing system 400 for search string construction, evaluation, and improvement according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 (e.g., the processor(s) 321) for executing those instructions. Thus a system memory (e.g., memory 404) can store program instructions that when executed by the processing device 402 implement the engines described herein. Other engines can also be utilized to include other features and functionality described in other examples herein.

The processing system 400 includes a search string construction engine 410 for constructing search strings, a search string evaluation engine 412 for evaluating search strings, and a search string improvement engine 414 for improving search strings. For example, the search string construction engine 410 identifies a tuple based on an item description, which can be retrieved from a data store 422 using an item identifier received from a user device 420 (e.g., a smartphone, a laptop, a tablet, etc.) associated with a user 421. The tuple can include, for example, an item class (i.e., a category), an actor (i.e., a subject), and an action (i.e., a verb). The search string creation engine 412 then constructs, based on the tuple, a search string to be used to retrieve information such as images. The information, such as one or more images, can then be retrieved by the search engine 430 from the data store 422 or another image repository using the constructed search string. The search engine 430 can be integrated into the processing system 400 or another suitable processing system in a communicative connection with the processing system 400.

Using the retrieved images (i.e., search results), the search string evaluation engine 412 evaluates the search string constructed by the search string construction engine 410. For example, the search string evaluation engine 412 uses search results to build a similarity matrix having cells. The search string evaluation engine 412 compares each of the images to each of the other images of the search results and computes a similarity score for the image pair. The search string evaluation engine 412 then calculates a percentage of the similarity scores that exceeds a first threshold (e.g., 60%), and then the search string evaluation engine 412 determines whether the percentage exceeds a second threshold (e.g. 75%). If the second threshold is met or exceeded, the search string evaluation engine 412 indicates that the search string is effective; however, if the second threshold is not met or exceeded, the search string evaluation engine 412 indicates that the search string is ineffective.

If the search string evaluation engine 412 determines that the search string is ineffective, the search string improvement engine 414 can improve the search string. In particular, the search string improvement engine 414 can generate an alternative search string, such as using ontology siblings, using n-grams in titles of the items in an ontology class, identifying multiple uses for an item, and the like. This enables a search string to be improved to provide more useful results to the user.

Figure 5:
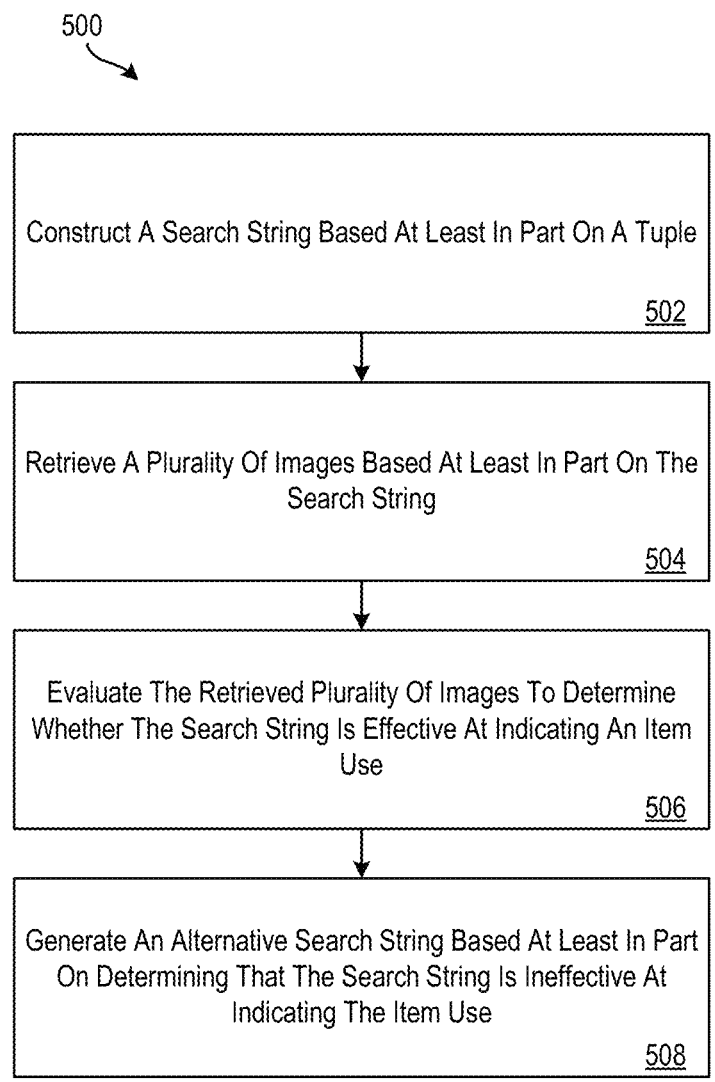
FIG. 5 depicts a flow diagram of a method for constructing, evaluating, and improving a search string, according to aspects of the present disclosure.

FIG. 5 depicts a flow diagram of a method for constructing, evaluating, and improving a search string, according to aspects of the present disclosure. The method 500 can be implemented using any suitable processing system and/or processing device, such as the cloud computing environment 50 of FIG. 1, the processing system 300 of FIG. 3, the processing system 400 of FIG. 4, or any other suitable processing system and/or processing device.

At block 502, the search string construction engine 410 constructs a search string based at least in part on a tuple. Search string construction is described in more detail herein with reference to FIG. 6. At block 504, the search engine 430 retrieves a plurality of images based at least in part on the search string. At block 506, the search string evaluation engine 412 evaluates the retrieved plurality of images to determine whether the search string is effective. Search string evaluation is described in more detail herein with reference to FIG. 6. At block 508, the search string improvement engine 414 generates an alternative search string when it is determined that the search string is ineffective. Search string improvement is described in more detail herein with reference to FIG. 12.

Additional processes also may be included, and it should be understood that the processes depicted in FIG. 5 represent illustrations, and that other processes may be added or existing processes may be removed, modified, or rearranged without departing from the scope and spirit of the present disclosure.

Figure 6:
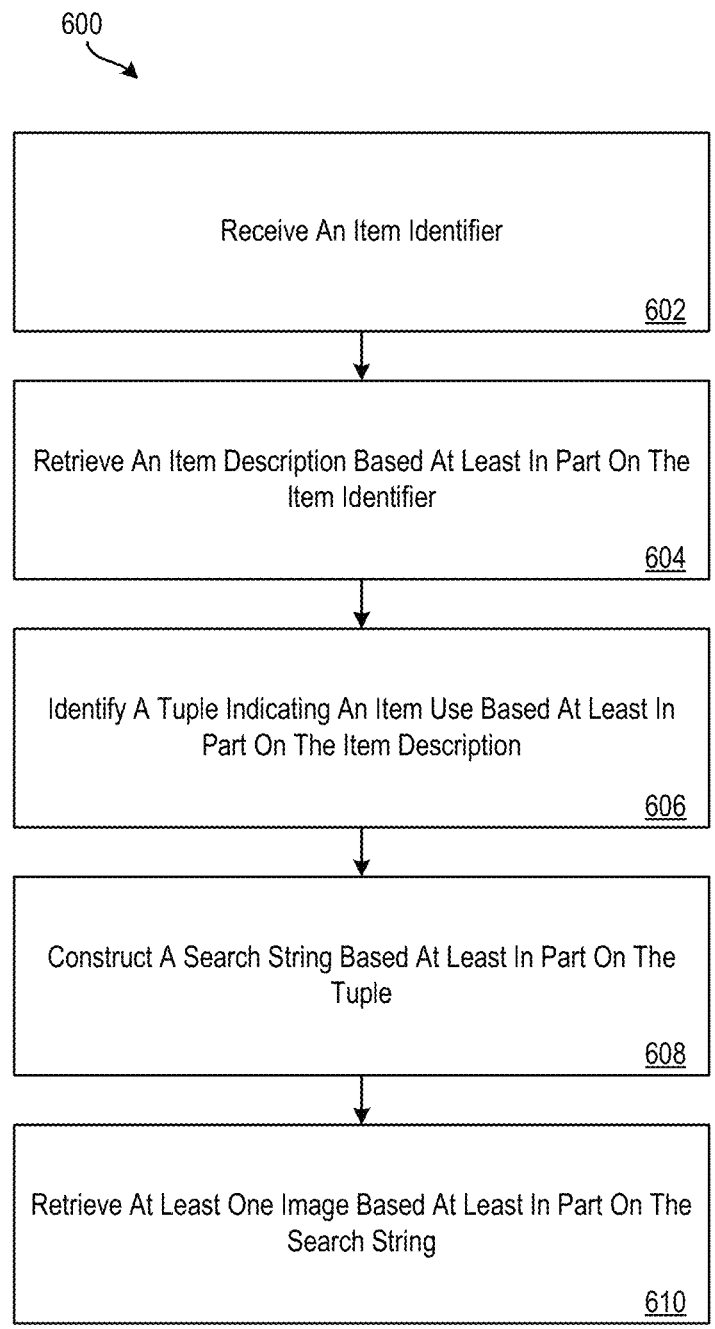
FIG. 6 depicts a flow diagram of a method for constructing a search string, according to aspects of the present disclosure.

FIG. 6 depicts a flow diagram of a method 600 for constructing a search string, according to aspects of the present disclosure. The method 600 can be implemented using any suitable processing system and/or processing device, such as the cloud computing environment 50 of FIG. 1, the processing system 300 of FIG. 3, the processing system 400 of FIG. 4, or any other suitable processing system and/or processing device.

At block 602, the search string construction engine 410 receives an item identifier. The item identifier can be, for example, an image/photograph of a product, a scanned universal product code (UPC), a two-dimensional barcode (e.g., a QR code), or another suitable identifier.

At block 604, the search string construction engine 410 retrieves an item description, such as from the data store 422, based at least in part on the item identifier. For example, the search string construction engine 410 can access a retailer's database of text descriptions of items (i.e., products). The text description includes information about the item, such as specifications (e.g., weight, dimensions, cost), warnings, uses, safety information, and the like.

At block 606, the search string construction engine 410 identifies a tuple based at least in part on the item description. That is, the search string construction engine 410 uses the item description to create a tuple for the item. The tuple is a sequence of an actor (i.e., a subject), an action (i.e., a verb), and an item class (i.e., a category) and can be expressed as <actor, action, item class>.

Figure 7:
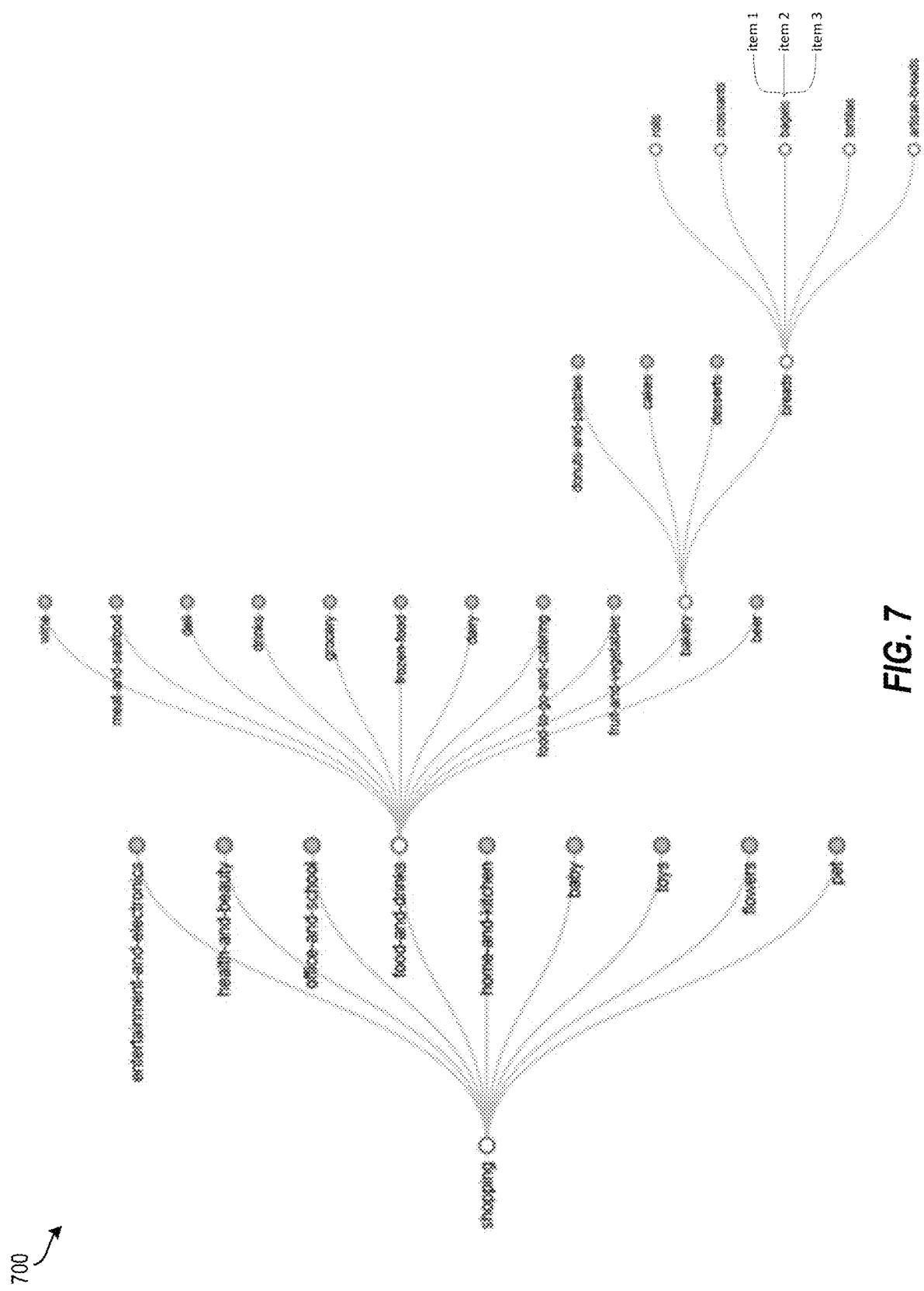
FIG. 7 depicts an example of an ontology listing, according to aspects of the present disclosure.

The item class of the tuple can be determined in a number of ways. For example, the item description retrieved at block 604 contains a placement of the item in an ontology listing or hierarchy. In such cases, the item identifier is used to look up the entry for the item in an item database (e.g., the data store 422) that includes the placement of the item in the ontology listing and the placement in the ontology listing is used to determine the item class. For example, a grocery store provides the ontology listing "food and drinks-→drinks→coffee, tea, and cocoa→tea→English breakfast black tea bags" for the item "English breakfast black tea bags." The ontology entry that precedes the item name (e.g., "English breakfast black tea bags") represents the item class for the item. In this example, the item class is "tea." FIG. 7 depicts an example of an ontology listing 700 of items, item classes and, hierarchically, classes of item classes, etc., according to aspects of the present disclosure. The example of FIG. 7 is based on "shopping." In an embodiment, items are, for example, individual products, such as "English breakfast black tea bags." An item would typically have, for example, a price and an associated UPC code. An item class is typically less specific and broad enough for those unfamiliar with the product to understand, e.g., "tea." Note that an item class can contain (be equivalent to) a single item. A single-item item class is suitable, for example, when the item is common enough to be well-represented in the text corpora as described herein and in the image store from which images are retrieved.

In another example, the item description retrieved at block 604 is used as an input into a classifier trained to map input text to an item class. The classifier can be trained, for example, on item descriptions, for example including item titles or text descriptions, for a variety of items. As an example, the items that the classifier is trained on are teas and cookies. The classifier is trained to output "tea" when the item description is from a tea item and output "cookie" when the item description is from a cookie item. For example, if the following item description is input, the classifier assigns an item class of "tea" to the item: "English breakfast is our most popular tea. To create this well-balanced blend, we carefully select the finest teas from five different regions, each with its own unique characteristics." The classes can be taken from those appearing in, for example, an ontology listing from a shopping website or a more general ontology, like WordNet.

In yet another example, an ontology template can be used to recognize an item class from the item description retrieved at block 604. For example, item descriptions may consistently include a sentence such as "OREO is a type of cookie." A template "X is a type of Y" can be applied to recognize "Y" as an item class for the item. According to aspects of the present disclosure, an item class is broad enough for those unfamiliar with a product to understand. For example, for "OREO" or "MILANOS" the item class is broadly "cookie."

The action (i.e., verb) of the tuple can also be determined in a number of ways, for example, using n-grams, word embeddings, etc. In the case of n-grams, the action (i.e., verb) is determined using n-gram analysis of a text database (e.g., employing GOOGLE n-grams, which provides statistics on the frequency that word pairs appear in a large corpus of text and could be extended with triples, etc.). N-grams are groups of n contiguous words, e.g., 2-grams are contiguous word pairs, 3-grams are three contiguous words, etc., and n-grams are typically extracted from a corpus. It is possible to exclude some words from the corpus when extracting n-grams, e.g., "the", "an", etc. The text database can be queried based on the class for the item, for example, to find the most commonly used action associated with the item. In the case of a "cookie" class, the action "eat" may be the most commonly used action. Actions in n-gram analysis can be identified, for example, by seeking all verbs or matching against a list of selected verbs that occur frequently with the item class.

Figure 8A:
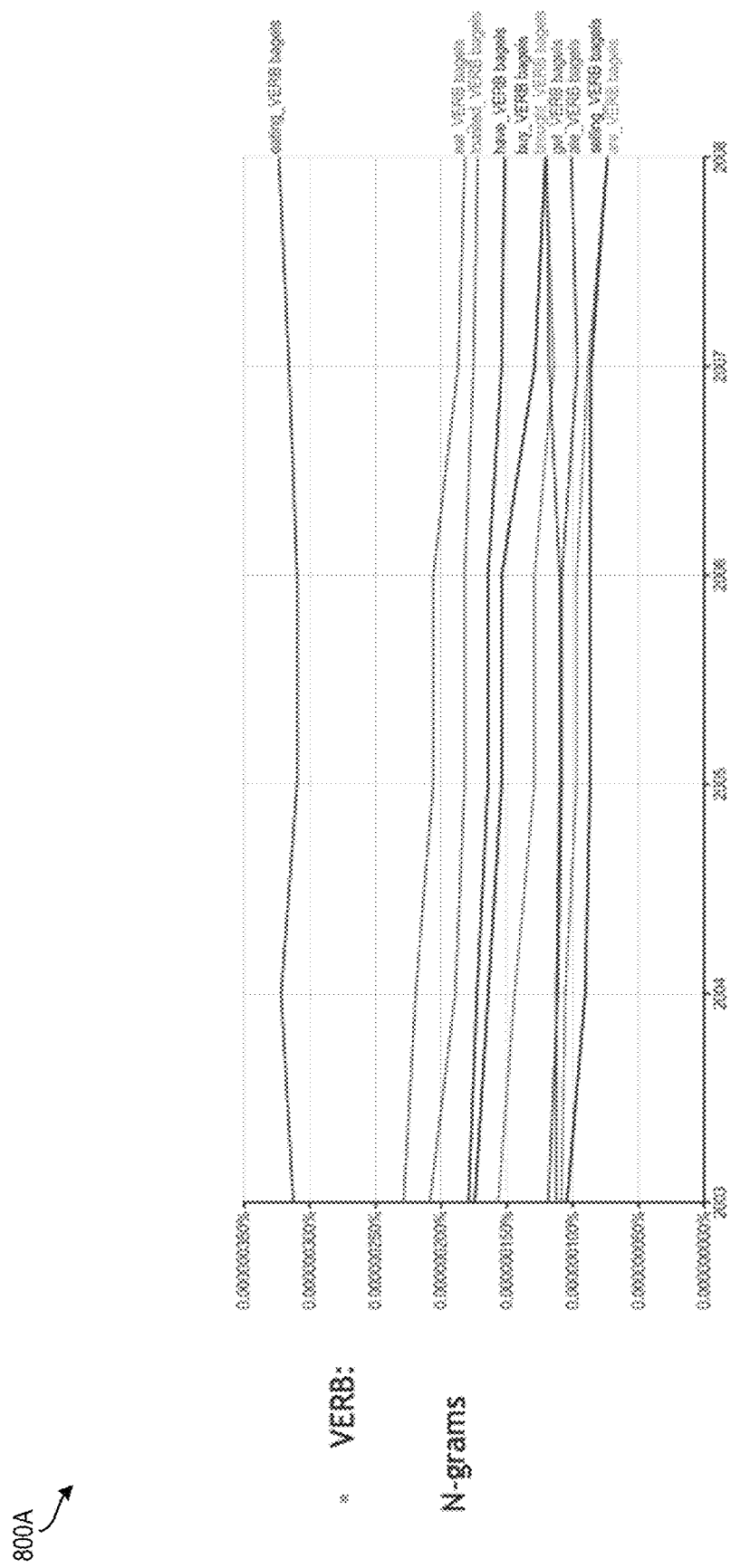
FIGS. 8A and 8B depict an approach to identifying an action using n-grams, according to aspects of the present disclosure.
Figure 8B:
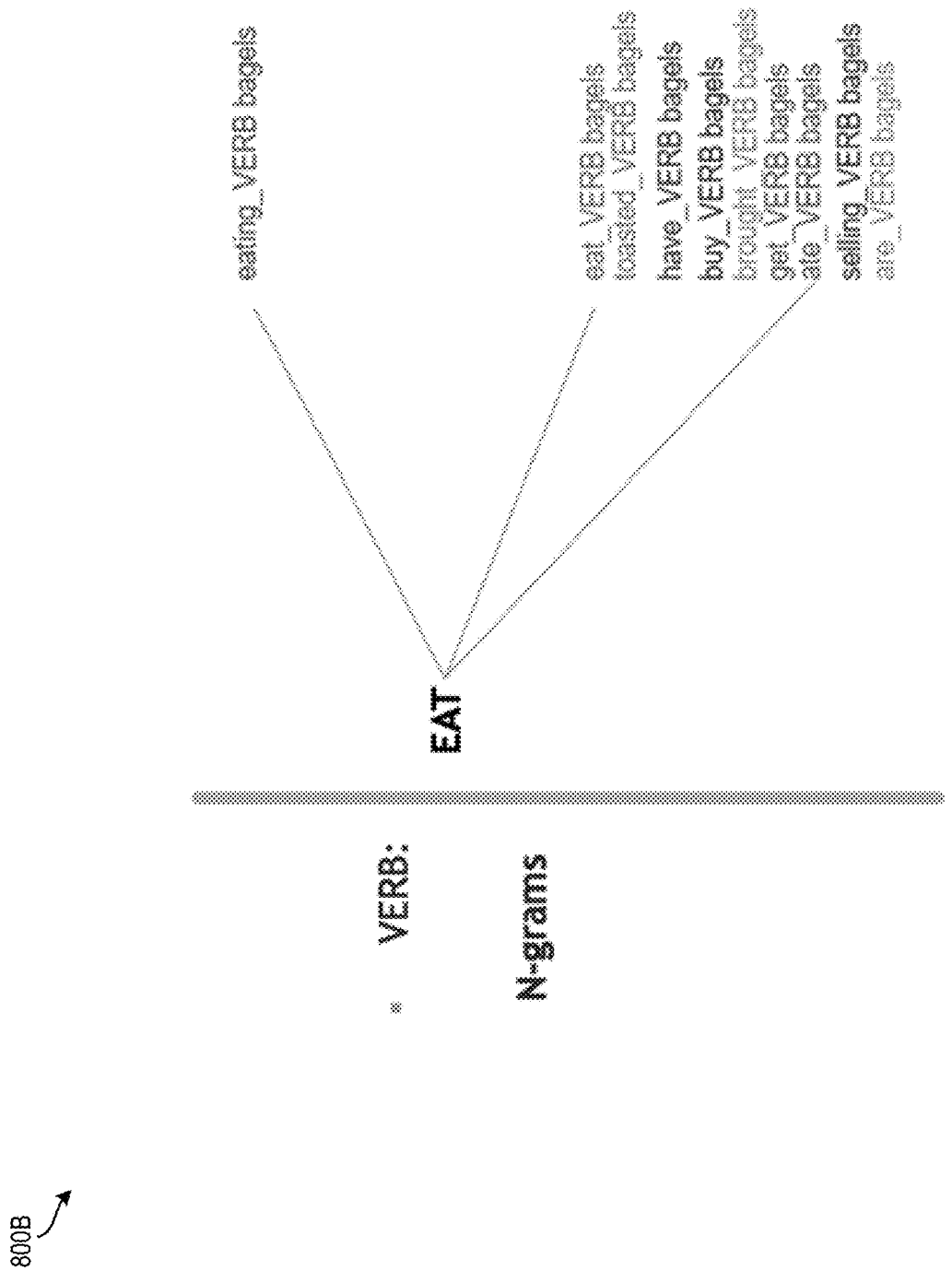

FIGS. 8A and 8B depict an approach to identifying an action using n-grams, according to aspects of the present disclosure. N-grams are created from a text corpus. Assuming the text corpus is representative of common usage, n-grams created from it can be used to indicate common usage of items in an item class. In FIG. 8A, an existing n-gram service, such as GOOGLE n-grams, that reports n-grams in a corpus is queried to find the frequency of occurrence of each (verb, item class) pair. In the example the item class is "bagels." Frequencies over time are depicted in the graph 800A. In FIG. 8B, an action (i.e., verb) corresponding to the highest frequency of occurrence of FIG. 8A is chosen by lemmatizing the actions, retrieving a set of lemmatized actions, and summing the frequency of occurrence of each action.

With continued reference to FIG. 6, another option for determining the action (i.e., verb) is to use word embeddings. Word embeddings provide representations of words in a v-dimensional space, where typically v<w, and w is the number of words in the vocabulary. Word embeddings are trained on text corpora and are calculated, for example, using dimension reduction techniques (e.g., latent semantic analysis). According to aspects of the present disclosure, word embeddings are used to determine the action by finding a closest action, from all actions or a pre-defined set of actions, relative to the item class of interest (e.g., the item class of the item identified by the item identifier). For example, the nearest action to "cookie" measured in the word embedding space is likely to be "eat."

In another example of using word embeddings to determine the action, the linear relationship properties of word embeddings are used to determine actions and actors through analogies. For example, "coffee−drink+cookie=eat." Known correspondences among relationships are used (e.g., for "cookie" it is known that the same relationship is desired as "coffee" is to "drink"). Then, a known relationship is used to determine the action for the item class of interest. In this case, "coffee is to drink" is the known relationship and "cookie is to x" is the relationship desired to be determined. "Cookie" is the item class and "eat" is the determined action.

Figure 9:
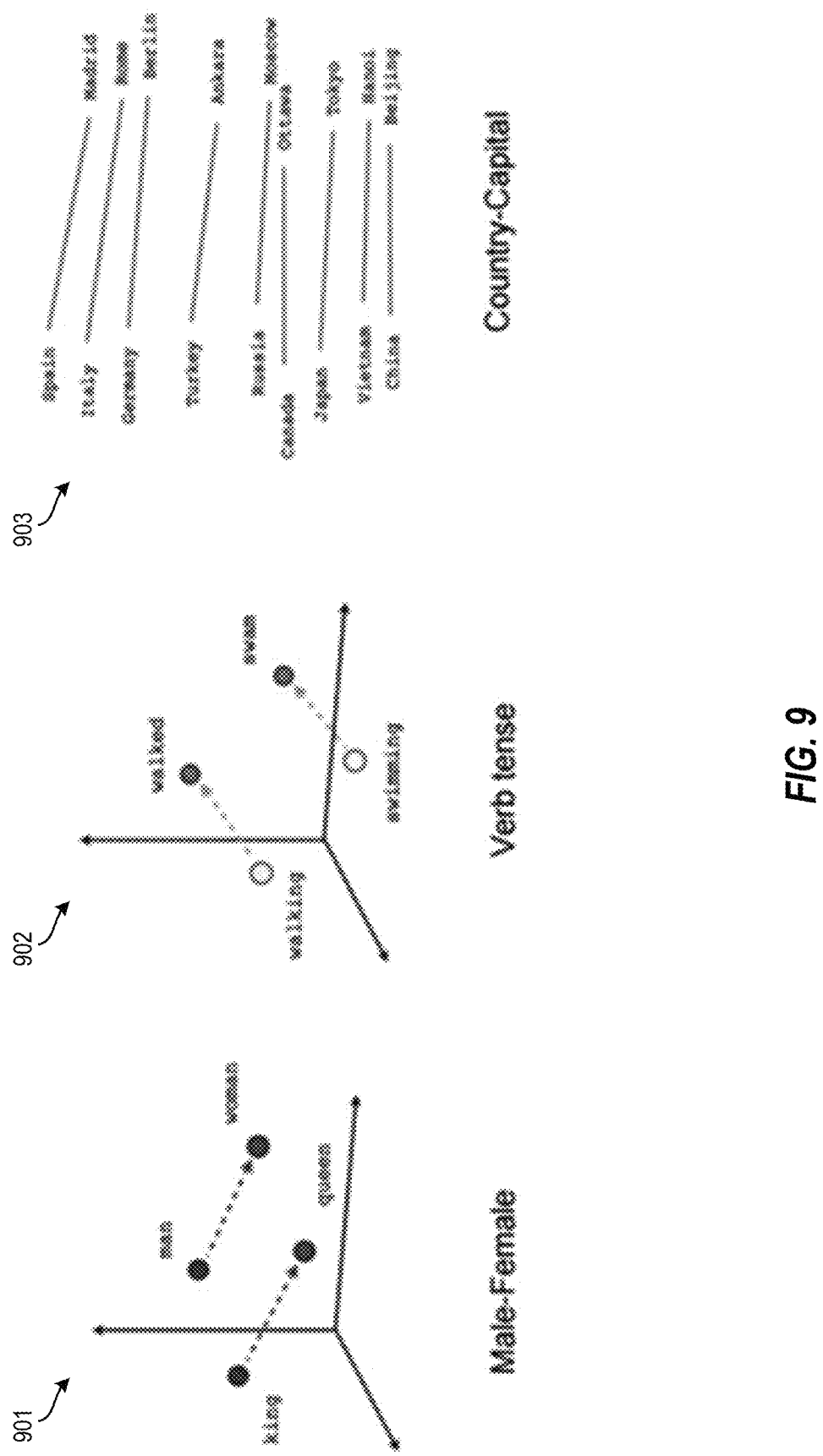
FIG. 9 depicts an approach to identifying an action using word embeddings, according to aspects of the present disclosure.

FIG. 9 depicts an approach to identifying an action using word embeddings, according to aspects of the present disclosure. Word embeddings, such as GloVe or word2vec represent words as vectors, and vector arithmetic can be used to determine relationships between words. The graphs 901, 902, 903 depict relationships between male-female, verb tense, and country-capital respectively. In an example, the relationship is used to find the nearest verb for a given item class using vector distance determination, for example. In another example, the nearest verb is determined by analogy.

With continued reference to FIG. 6, identifying common usages is helpful for at least the following reasons. The item uses that are most likely to illustrate the product for the user are the common ones, and images reflecting common usage are most likely to be available in image retrieval databases (e.g., GOOGLE images). In some situations, the action is augmented with a preposition, for example, "eat cookies" is acceptable, but for "bleach" a preposition can provide additional context ("clean with bleach").

The actor (e.g., subject) of the tuple can be determined similarly to determining the action as described herein. For example, n-grams can be used to select which of a predetermined set of actors (e.g., "man," "woman," "adult," "child," "dog", "cat," etc.) is most commonly used with an action and an item class (e.g., "eat cookie"). In another example, word embeddings can be used to find the closest actor to the item class. In yet another example, word embeddings can be used through analogies (e.g., "coffee"–"adult"+"cookie"="child"). The examples depicted in FIGS. 8A, 8B and 9 can apply to determining actions and determining actors.

It should be appreciated that the action can be determined before or after the actor is determined. In addition, whichever of the actor or action is determined first can be used to determine the second of the actor or action. For example, if the action is determined first, the action can be used as additional information to determine the actor. Similarly, if the actor is determined first, the actor can be used as additional information to determine the action. In other examples, actor and action can be determined without using the other as additional information.

Together, the action, the actor, and the item class comprise the tuple, which is used to construct the search string. In particular, at block 608, the search string construction engine 410 constructs the search string based at least in part on the tuple. The search string takes the form of "subject verb-ing (preposition) object" where the subject is the actor, the verb is the action, and the object is the item class. For example, for the tuple<woman, eat, cookie>, the search string is "woman eating cookie." Similarly, for the tuple<man, clean, bleach>, the search string is "man cleaning with bleach."

In some examples, it may be possible that no item class can be identified using the chosen item class identification strategy. For example, the item may not be not found in an ontology listing as described herein; no high-confidence result may be returned by any item-class classifier as described herein; or no item class can be determined using a template as described herein. In that case, a proxy for the item class can be used to determine an action and actor, e.g., the item title can be used as the item class if a title is found in the item description. If no proxy can be determined, e.g., because the item identifier is a photo with no text label, the process may return an error value. In some examples, it may be possible that no action can be identified, for example because the item class is not found in the corpus used for an n-gram or word-embedding approach as described herein. In that case, a default action, such as "using" can be employed. Similarly, in some examples, it may be possible that no actor can be identified, for example because the item class is not found in the corpus used for an n-gram or word-embedding approach as described herein. In that case, a default action, such as "person" or "woman" can be employed. Also, if an item class is not found in the corpus used for an n-gram or word-embedding approach as described herein, or appears rarely in the corpus, it may be possible to use ontology siblings or parents of the item class to determine the action and/or actor. A way to use ontology siblings or parents of the item class to determine the action and/or actor is described herein.

At block 610, the search engine 430 retrieves at least one image based at least in part on the search string. In the case of the tuple<woman, eat, cookie>, the search engine 430 retrieves images of a woman eating a cookie. Similarly, for the tuple<man, clean, bleach>, the search engine 430 retrieves images of a man cleaning with bleach. It should be appreciated that the search string can be used, for example, to guide a web-based image search or search from another repository of images. It can also be used to guide generation of an image using a machine learning model that generates images based on a text description.

Additional processes also may be included, and it should be understood that the processes depicted in FIG. 6 represent illustrations and that other processes may be added or existing processes may be removed, modified, or rearranged without departing from the scope and spirit of the present disclosure.

Figure 10:
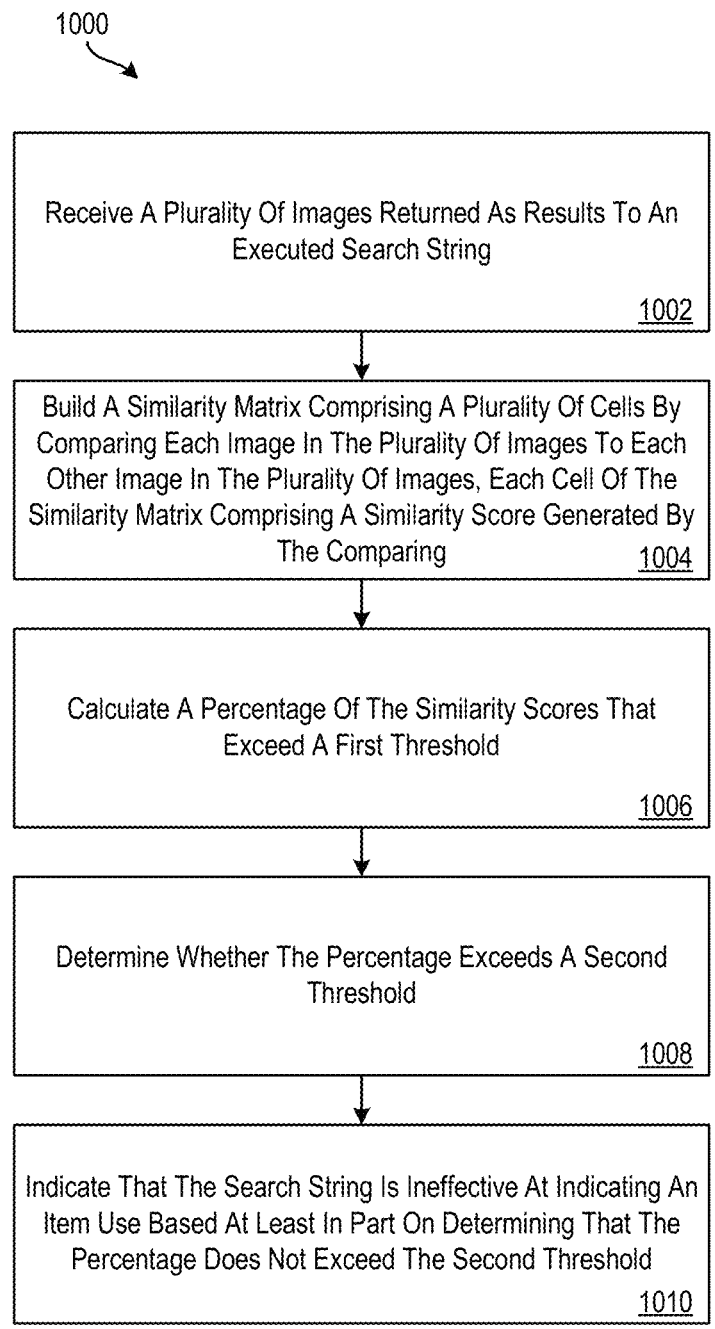
FIG. 10 depicts a flow diagram of a method for evaluating a search string, according to aspects of the present disclosure.

FIG. 10 depicts a flow diagram of a method 1000 for evaluating a search string, according to aspects of the present disclosure. The method 1000 can be implemented using any suitable processing system and/or processing device, such as the cloud computing environment 50 of FIG. 1, the processing system 300 of FIG. 3, the processing system 400 of FIG. 4, or any other suitable processing system and/or processing device.

It is beneficial to evaluate search strings because automatically-generated search strings can be non-sensical or ambiguous. For example, an automatically-generated search string, "woman using packing" may not make sense. Similarly, "man using oil" could be ambiguous, since oil can be used in a variety of settings, such as automotive or cooking. Such search strings may be ineffective at returning images that indicate product usage. Additionally, the search string may seek images of rare item classes, too rare to return images effective at indicating product usage (e.g., "woman eating horseradish" may not return good images because "horseradish" is a rare item class, whereas "woman eating peanuts" is not similarly problematic because "peanuts" is a common item class). An indicator of an ineffective search string is returning of images that are dissimilar. That is, a search string is considered ineffective when it returns inconsistent results. To assess inconsistency, the following evaluation technique is provided.

At block 1002, the search string evaluation engine 412 receives a plurality of images returned as search results to an executed search string. For example, the search string engine 430 performs a search using a search string and returns the results as a plurality of images.

At block 1004, the search string evaluation engine 412 builds a similarity matrix. The similarity matrix includes a plurality of cells arranged in columns and rows where each column represents an image returned in the search results and each row represents an image returned in the search results. The search string evaluation engine 412 compares each image in the plurality of images to each other image in the plurality of images to generate a similarity score based on how similar (or dissimilar) the images are.

Figure 11:
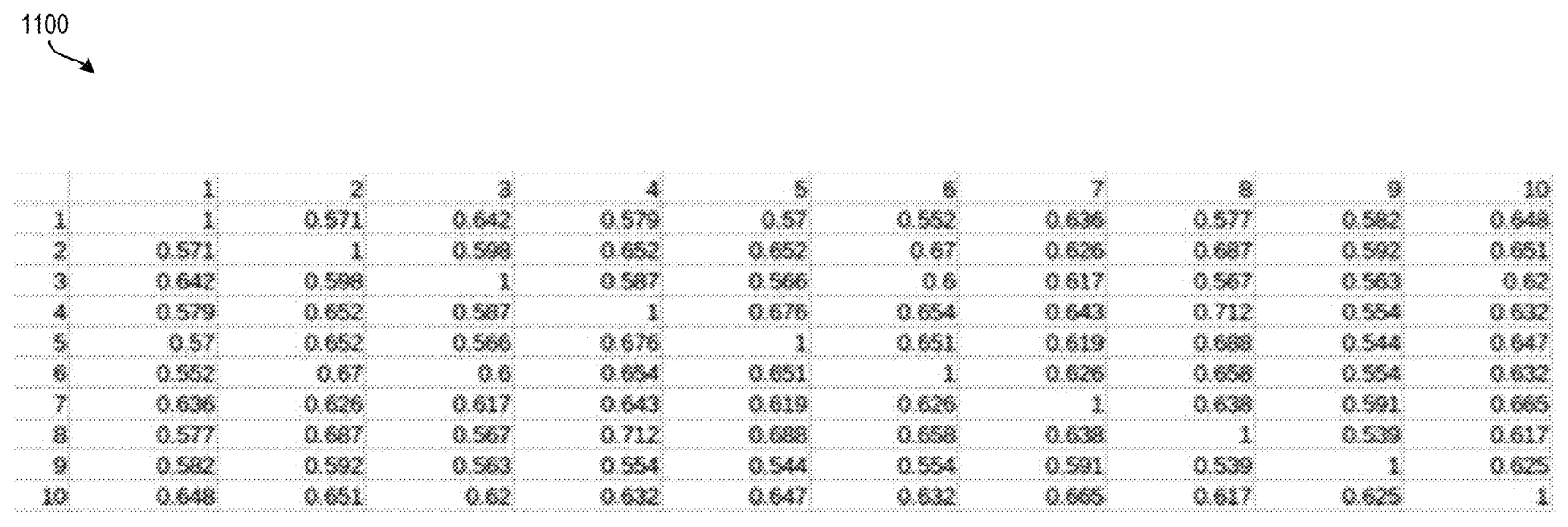

FIG. 11 depicts a similarity matrix 1100, according to aspects of the present disclosure. For example, assuming the plurality of images returned as results to an executed search includes 10 images, in an example, the search string evaluation engine 412 compares the first image to each of the other nine images (e.g., image 1 to image 2, image 1 to image 3, image 1 to image 4, etc.), calculates a similarity score for each comparison, and stores the similarity score in the similarity matrix.

With continued reference to FIG. 10, the search string evaluation engine 412 then compares the second image to each of the other nine images (e.g., image 2 to image 1, image 2 to image 3, image 2 to image 4, etc.), calculates a similarity score for each comparison, and stores the similarity score in the similarity matrix. This continues until each of the images is compared to each of the other images, a similarity score is calculated for each comparison, and the similarity score is stored in the matrix.

In the example of FIG. 11, the first column stores the similarity scores for the first image as compared to each of the other nine images, the second column stores the similarity scores for the second image as compared to each of the other nine images, and so on. Similarly, the first row stores the similarity scores for the first image as compared to each of the other nine images, the second row stores the similarity scores for the second image as compared to each of the other nine images, and so on. In this way, the search string evaluation engine 412 calculates and stores a similarity score for each of the plurality of images.

According to aspects of the present disclosure, the similarity scores can be determined using image comparison techniques or image similarity algorithms, such as using the Watson Visual Recognition API created by IBM.

With continued reference to FIG. 10, at block 1006, the search string evaluation engine 412 calculates a percentage of the similarity scores stored in the similarity matrix that exceed a first threshold. For example, the first threshold can be defined as 0.6 (60%). Any two images with a similarity score in excess of the first threshold are considered "similar" while any two images with a similarity score below the first threshold are considered "dissimilar." In examples, a similarity score of "0" indicates no similarity between two images, and a similarity score of "1" indicates exact similarity (e.g., a copy) between the two images. It should be appreciated that the first threshold can be any suitable value and can be predefined and/or adjustable. Based on the similarity score for each image pair, the search string evaluation engine 412 calculates a percentage of the similarity scores that are greater than the first threshold. At block 1008, the search string evaluation engine 412 then determines whether the calculated percentage exceeds a second threshold. For example, the second threshold can be defined as 0.7 (70%). If the calculated percentage is in excess of the second threshold, the search is considered effective. However, if the calculated percentage is not in excess of the second threshold, the search is considered ineffective and it may be desirable to improve the search string, as described herein. In particular, at block 1010, the search string evaluation engine 412 indicates that the search string is ineffective when it is determined that the percentage does not exceed the second threshold. The pairwise comparison scores that populate the cells of the similarity matrix can be referred to as pairwise-image comparison scores and the first threshold can be referred to as the pairwise-image threshold. The calculated percentage can be referred to as the collection similarity score and the second threshold can be referred to as the collection threshold.

Alternative processes for using image similarity to assess search string effectiveness can be used. For example, a randomly chosen single image from a plurality of returned images can be chosen and compared to a random sample of n other returned images. In that case, an n by 1 similarity matrix can be constructed. A first similarity threshold can be used to evaluate similarity for each pairwise comparison. Then a second threshold can be used to determine if a sufficient fraction of the pairs are similar. In other examples, an assessment is made by comparing a single a random pair of images, a plurality of random pairs of images, a set of k images compared pairwise to a set of m images, i sets of $k_i$, images compared pairwise to corresponding i sets of $m_i$ images, etc. Generally, subsets of images or multiple groups of subsets of images could be chosen (e.g., randomly) and images within the subset compared one to another. Pairwise image similarity scores are the results of comparing pairs of images and can be compared to a pairwise-image threshold. As would be understood by someone skilled in the art, different pairwise image thresholds can be set for different sets of pairs, etc. The collection similarity score is the overall score assigned based on the comparing of the plurality of images, e.g., the percentage of pairwise-image similarity scores that exceed the pairwise image threshold. Other means of calculating a collection similarity score are possible, as would be understood by one skilled in the art. These various processes may be particularly advantageous when image comparisons are computationally expensive or time-consuming or when there are a very large number of images to be compared.

Additional processes also may be included. For example, the search string evaluation engine 412 can also calculate based on the similarity scores stored in the similarity matrix one or more of an average matrix similarity score, a maximum matrix similarity score, a minimum matrix similarity score, a range of matrix similarity scores, an average similarity score for each image, a maximum of the average similarity scores for each image, etc. It should be understood that the processes depicted in FIG. 10 represent illustrations and that other processes may be added or existing processes may be removed, modified, or rearranged without departing from the scope and spirit of the present disclosure.

Figure 12:
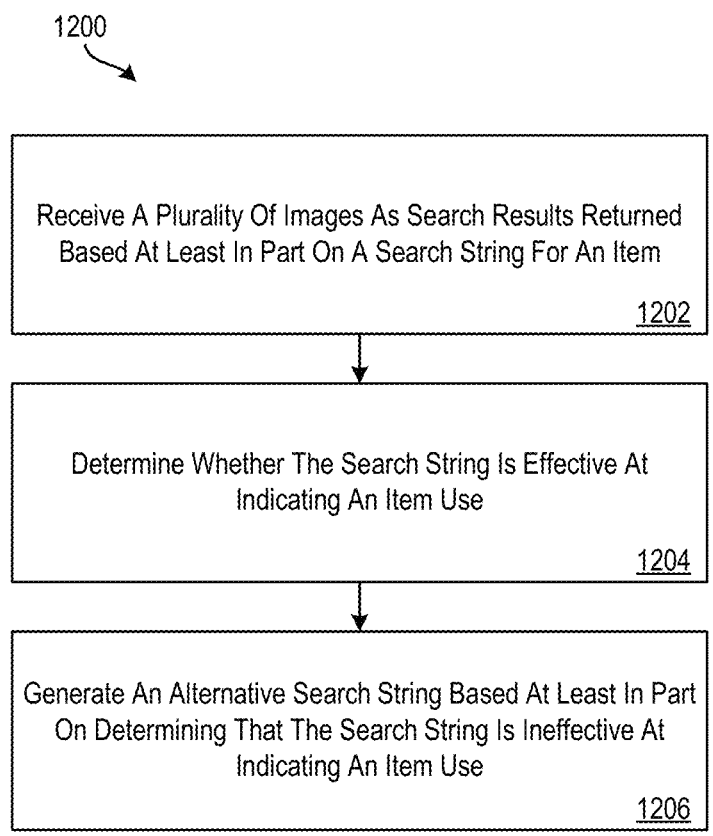
FIG. 12 depicts a flow diagram of a method for improving a search string, according to aspects of the present disclosure.

FIG. 12 depicts a flow diagram of a method 1200 for improving a search string, according to aspects of the present disclosure. The method 1200 can be implemented using any suitable processing system and/or processing device, such as the cloud computing environment 50 of FIG. 1, the processing system 300 of FIG. 3, the processing system 400 of FIG. 4, or any other suitable processing system and/or processing device.

At block 1202, the processing system 400 receives a plurality of images as search results (such as from the search engine 430) returned based at least in part on a search string for an item class. The search string can be generated, for example, by the search string construction engine 410.

At block 1204, the search string evaluation engine 412 determines whether the search string is effective. The search string effectiveness determination is described in detail herein with reference to the method 1000 depicted in FIG. 10.

At block 1206, the search string improvement engine 414 generates an alternative search string when it is determined that the search string is ineffective. The search string improvement engine 414 can generate the alternative search string in a number of ways, for example, using ontology siblings, clustering, and identifying multiple uses.

As discussed herein, search strings are created using a tuple and take the form of "subject verb-ing (preposition) object" where the subject is the actor, the verb is the action, and the object is the item class. A text corpora is used to reflect common item usage to influence the actor and action selection for a given class. As described herein, the item class can be taken from an ontology listing (see, e.g., FIG. 7). However, at times, the item class in an ontology listing is relatively uncommon in the text corpora used, and this can negatively affect the accuracy of a chosen actor and/or action. For example, the term "bagel" is relatively uncommon (especially in the GOOGLE n-gram corpus). According to aspects of the present disclosure, the search string improvement engine 414 uses ontology siblings of the item class to choose the action and/or actor. An ontology sibling for an item class is an item class that shares a common path to the root of the ontology. For example, in FIG. 7, "bagels" and "croissants" are ontology siblings. If "bagel" is uncommon in the corpus, the action "eat" may be hard to associate with "bagel" but aggregating the common verbs used with one or more ontology siblings (e.g., "rolls" and/or "croissants"), and optionally aggregating the common verbs used with "bagel" as well, returns the action "eat." A parent class, if one exists, can also be used instead of or in addition to ontology siblings, e.g., "breads" in FIG. 7.

If the item class is determined instead using a trained classifier or template as described earlier, ontology siblings can still be used to choose the actor and/or action by identifying or creating an ontology that contains the item class, locating the item class within the ontology and locating its siblings.

According to additional aspects of the present disclosure, the search string improvement engine 414 can use clustering to find representative item classes within an initial item class in an ontology listing. As described herein, an item can be used to determine an item class, but some initial item classes in an ontology listing can be amalgamations of items that are actually different. For example, the "German food" initial item class contains items that are sauerkraut, sausages, pickles, mustard, etc. To address this problem, words or n-grams contained in the titles of items in the ontology listing class can be clustered to create sub-classes, which are then considered the item classes for the corresponding items. The clustering identifies common words or n-grams in the titles and puts items with those common words or n-grams into a cluster. The shared title words or n-grams among the clustered items are considered the item class labels for the cluster. For example, for items in an initial item class containing items with titles "Dragon Hot Sausage", "Meadow Mild Sausage", "Original Sauerkraut", and "Spicy Sauerkraut", two clusters are created. In this example, item class A is sauerkraut, and item class B is sausages. The search string improvement engine 414 generates an alternative search string for each sub-class (e.g., "actor acting item class A," "actor acting item class B") where the actor and action can be chosen as described herein and each of these search strings can be added to a search string queue for searching (e.g., by the search engine 430). In some examples, the search string appropriate for a particular item can be determined, for example, by identifying a cluster class label in the title of the item.

If an initial amalgamated item class is determined using a trained classifier or template as described earlier, instead of from an ontology listing, clustering of n-grams in titles of items in the initial item class can still potentially be used to choose the actor and/or action by identifying or creating an ontology that contains the initial item class, locating the initial item class within the ontology, collecting titles of items in the initial item class, clustering n-grams in the titles to create sub-classes and creating alternative search strings for each sub-class.

According to yet additional aspects of the present disclosure, the search string improvement engine 414 can identify item classes with multiple uses. For example, oil can be used for cooking, cleaning, hygiene, automotive, etc. One example of identifying item classes with multiple uses is if the class is found in multiple places in the ontology listing (e.g., in cooking, in automotive, in hair care, etc.). In that case, it may be possible to apply word embedding or n-gram techniques, as described herein, to text corpora particular to the multiple subject areas identified in the ontology. For example, n-gram analyses can be performed separately on a corpus of texts related to cooking and a corpus of texts related to automobiles. Determining actors and actions based on each corpus's n-grams can produce search strings for each area of the ontology in which the item class is found. Another example of identifying items with multiple common uses is when the n-gram or word embeddings techniques described herein identify multiple common non-lemma actions and/or actors for an item class. In this case, for example, the search string improvement engine 414 generates search strings with variations for the different non-lemma actions and or actors (e.g., "actor acting1 item class," "actor acting2 item class," etc.). A threshold can be set, for example, to determine how frequently in an n-gram analysis an action or actor must occur with an item class to consider their co-occurrence common. In some examples, it can be decided which use the user is interested in by using additional context information, such as user profession, hobbies or web browsing history or user or item location. In some examples, it may be desirable to separately evaluate and/or display results from multiple search strings, each corresponding to a different use.

In some examples, it may be possible that no alternative search string can be generated. An example is when an ontology sibling alternative search string strategy is chosen, but the item class has no ontology siblings. In the case that no alternative search string can be generated, the process can return an error value. In some examples, it may be possible that one or more alterative search strings have been generated, but determined to be ineffective, e.g., as described herein, and no further alternative search string can be generated. In that case, the process can return an error value.

Additional processes also may be included, and it should be understood that the processes depicted in FIG. 12 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for improving a search string, the method comprising:
  receiving, by a processing device, a plurality of images as search results returned based at least in part on a search string for an item in the form of a tuple comprising an item class, an action and an actor, wherein the item class is identified from an ontology listing by identifying a placement of the item in the ontology listing by item name, wherein the item class is a class of items that precedes the item name in the ontology listing;

determining, by the processing device, whether the search string is effective at indicating an item use based on image similarity; and based at least in part on determining that the search string is ineffective at indicating the item use, generating, by the processing device, an alternative search string, wherein the alternative search string is in a form of a tuple comprising an item class, an action, and an actor, wherein generating the alternative search string further comprises using ontology siblings to generate the alternative search string, and wherein using ontology siblings to generate the alternative search string further comprises using ontology siblings of the item class to choose the action and the actor associated with the item class.

2. The computer-implemented method of claim 1, wherein determining whether the search string is effective at indicating the item use comprises:

calculating, by the processing device, a similarity score by comparing at least one of the plurality of images to at least one other of the plurality of images;

determining, by the processing device, whether the similarity score exceeds a threshold; and based at least in part on determining that the similarity score does not exceed the threshold, indicating that the search string is ineffective at indicating the item use.

3. The computer-implemented method of claim 1, wherein generating the alternative search string further comprises identifying that the item class has multiple common uses.

4. The computer-implemented method of claim 3, wherein the item is identified as having multiple common uses when a class for the item is found in multiple places in the ontology listing.

5. The computer-implemented method of claim 3, wherein the item class is identified as having multiple common uses when multiple actions or actors are identified for the item class based at least in part on using a n-gram technique.

6. The computer-implemented method of claim 3, wherein the item class is identified as having multiple common uses when multiple actions or actors are identified for the item class based at least in part on using a word embeddings technique.

7. A system for improving a search string, the system comprising:

a memory comprising computer readable instructions; and a processing device for executing the computer readable instructions for performing a method, the method comprising:

receiving, by the processing device, a plurality of images as search results returned based at least in part on a search string for an item in the form of a tuple comprising an item class, an action and an actor, wherein the item class is identified from an ontology listing by identifying a placement of the item in the ontology listing by item name, wherein the item class is a class of items that precedes the item name in the ontology listing;

determining, by the processing device, whether the search string is effective at indicating an item use based on image similarity; and based at least in part on determining that the search string is ineffective at indicating the item use, generating, by the processing device, an alternative search string, wherein the alternative search string is in a form of a tuple comprising an item class, an action, and an actor, wherein generating the alternative search string further comprises using ontology siblings to generate the alternative search string, and wherein using ontology siblings to generate the alternative search string further comprises using ontology siblings of the item class to choose the action and the actor associated with the item class.

8. The system of claim 7, wherein determining whether the search string is effective at indicating the item use comprises:

calculating, by the processing device, a similarity score by comparing at least one of the plurality of images to at least one other of the plurality of images;

determining, by the processing device, whether the similarity score exceeds a threshold; and based at least in part on determining that the similarity score does not exceed the threshold, indicating that the search string is ineffective at indicating the item use.

9. The system of claim 7, wherein generating the alternative search string further comprises identifying that the item class has multiple common uses.

10. The system of claim 9, wherein the item is identified as having multiple common uses when a class for the item is found in multiple places in the ontology listing.

11. The system of claim 9, wherein the item class is identified as having multiple common uses when multiple actions or actors are identified for the item class based at least in part on using a n-gram technique.

12. A computer program product for improving a search string, the computer program product comprising:

a computer readable storage medium having program instructions embodied therewith, the program instructions executable by a processing device to cause the processing device to perform a method comprising:

receiving, by the processing device, a plurality of images as search results returned based at least in part on a search string for an item in the form of a tuple comprising an item class, an action and an actor, wherein the item class is identified from an ontology listing by identifying a placement of the item in the ontology listing by item name, wherein the item class is a class of items that precedes the item name in the ontology listing;

determining, by the processing device, whether the search string is effective at indicating an item use based on image similarity; and based at least in part on determining that the search string is ineffective at indicating the item use, generating, by the processing device, an alternative search string, wherein the alternative search string is in a form of a tuple comprising an item class, an action, and an actor, wherein generating the alternative search string further comprises using ontology siblings to generate the alternative search string, and wherein using ontology siblings to generate the alternative search string further comprises using ontology siblings of the item class to choose the action and the actor associated with the item class.

\* \* \* \* \*